(No Model.)

J. F. PHAGAN.
BED SPRING STRETCHER.

No. 605,009. Patented May 31, 1898.

Witnesses
C. E. Hunt.
Victor J. Evans.

Inventor
James F. Phagan,
by V. D. Stockbridge
Attorney

THE NORRIS PETERS CO., PHOTO-LITHO., WASHINGTON, D. C.

UNITED STATES PATENT OFFICE.

JAMES F. PHAGAN, OF CHEYENNE, WYOMING.

BED-SPRING STRETCHER.

SPECIFICATION forming part of Letters Patent No. 605,009, dated May 31, 1898.

Application filed October 21, 1897. Serial No. 655,933. (No model.)

*To all whom it may concern:*

Be it known that I, JAMES F. PHAGAN, a citizen of the United States, residing at Cheyenne, in the county of Laramie and State of Wyoming, have invented certain new and useful Improvements in Bed-Spring Stretchers; and I do hereby declare the following to be a full, clear, and exact description of the invention, such as will enable others skilled in the art to which it appertains to make and use the same.

My invention relates to stretching devices for woven-wire bed-springs; and it consists in the construction, combination, and arrangement of parts, which will be hereinafter more fully described and claimed.

Figure 1:
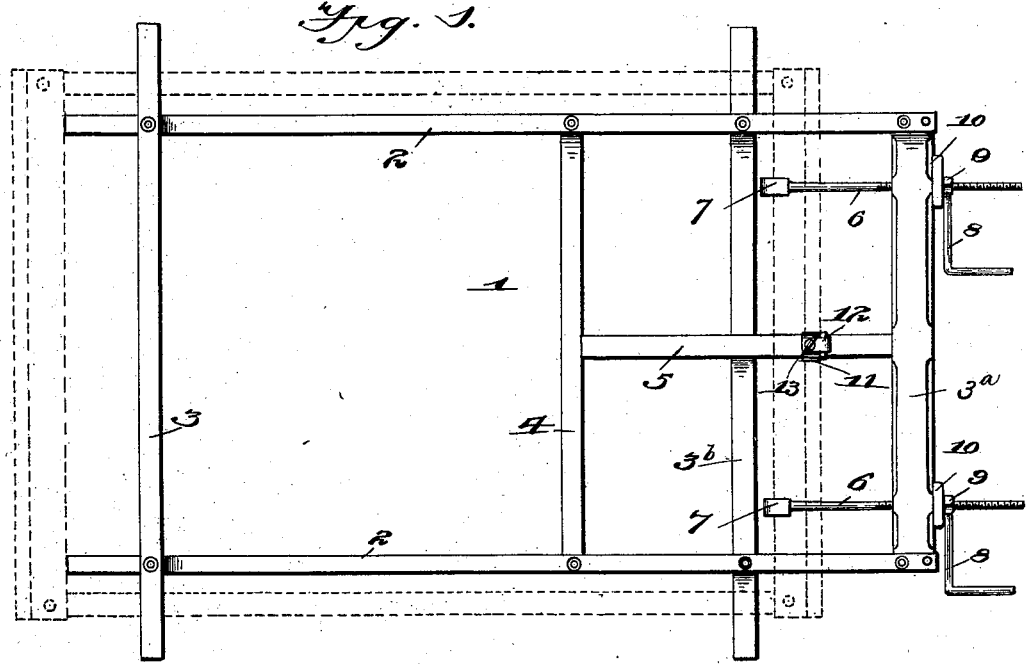
Figure 2:
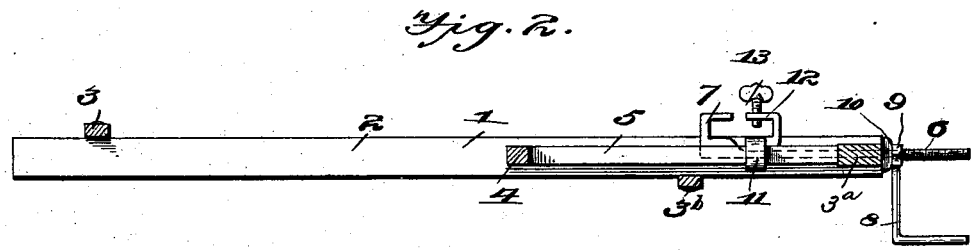
Figure 3:

Figure 1 is a plan view of the spring-stretcher. Fig. 2 is a vertical longitudinal section thereof, and Fig. 3 is a perspective view of the sliding clamp adapted to be secured to the central portion of the cross-bar of the frame of the bed-spring.

Referring to the drawings, numeral 1 indicates a frame which in the present instance is composed of two parallel side bars 2 and parallel end bars 3 and $3^a$, all of which are firmly bolted together at or adjacent to their ends. Secured to the side bars and extending transversely across the frame is a bar 4, which has secured thereto at or about the center a bar 5, extending to the end bar $3^a$, where it is firmly secured in any convenient and well-known manner. Also secured to the side bars 2, on the under side thereof and extending transversely of the frame, is a bar $3^b$, which is preferably of the same length as and parallel to the bar 3, both the bars 3 and $3^b$ extending out beyond the side bars 2 2, for a purpose which will hereinafter appear. Passing through the end bar $3^a$, near the ends thereof, are two externally-screw-threaded shafts or rods 6, provided at their forward ends with hooks 7, adapted to embrace the cross-bar at one end or the other of the bed-spring frame.

The numeral 8 indicates two cranks provided with enlargements 9, perforated centrally, screw-threaded internally, and adapted to be screwed upon the externally-screw-threaded shafts 6. Interposed between the side of the cross-bar $3^a$ and the cranks are two wear-blocks 10, against which the cranks bear. I preferably provide upon the bar 5 a runner 11, which is preferably made integral with the clamp 12, adapted to extend a short distance over the edge of the end bar of the bed-spring frame and be secured thereto by means of a set-screw 13.

In operation the bolts are removed from the bed-spring frame, the desired amount of wire is trimmed off, and the bolts are replaced and tightened, in which condition it is ready to be stretched. It is apparent that when the cranks are turned the screw-threaded shafts will be drawn through the end bar $3^a$, the runner 11 meanwhile sliding upon the bar 5, and thus enabling the spring to be stretched to the desired extent.

The bar 3 of the stretcher-frame being located upon the upper surface of the side bars 2 2 and the bar $3^b$ being located upon the under surface of said bars 2 2, it will be seen that when the bed-spring frame is inserted in place, as shown in Fig. 1 of the drawings, one of the end bars of said bed-spring frame will be engaged by the ends of the side bars 2 2 of the stretcher-frame, and the side bars of said bed-spring frame will lie beneath the bar 3 and on top of the bar $3^b$. It will also be observed that as the opposite end bar of the bed-spring frame fits within the clamp 12, which is slidingly mounted on the bar 5 of the stretcher-frame, upward movement of said bed-spring frame is prevented, although longitudinal movement thereof is permitted by means of the sliding connection between the clamp 12 and the bar 5. When the bed-spring frame has once been adjusted in position on the stretcher-frame therefor, it is impossible for it to accidentally slip therefrom.

Having thus described my invention, what I claim as new, and desire to secure by Letters Patent, is—

1. A stretching device for bed-springs, comprising a frame composed of two side bars and two end bars, screw-threaded shafts or rods extending through one of the end bars and provided with hooks adapted to embrace the end bar of the bed-spring frame, and cranks provided with internally-screw-threaded portions adapted to be screwed upon said screw-threaded shafts, whereby the said shafts are drawn through the end bar when the cranks are turned, substantially as and for the purpose set forth.

2. A stretching device for bed-springs, comprising two end bars and two side bars, the ends of the side bars at one end of the frame extending beyond the end bar and adapted to bear against the cross-bar of the bed-spring frame, screw-threaded shafts extending to the cross-bar at the opposite end of the bed-spring frame, and cranks provided with screw-threaded portions adapted to be screwed upon said shafts to draw them through the end bar of the stretcher-frame, substantially as and for the purpose set forth.

3. The combination with the end bar and side bars, of a transverse bar having its ends connected to the side bars, a horizontal bar connected to said transverse bar at one end, and having its other end connected with the end bar, a runner secured to said horizontal bar and provided with a clamp adapted to embrace the cross-bar of the bed-spring frame and to be secured thereto by a set-screw, and screw-threaded rods extending through said end bar and provided with means for attachment to the bed-spring frame, substantially as and for the purpose set forth.

4. A stretching device for bed-springs, consisting of a frame including in its structure a longitudinally-extending bar, means on said frame for elongating the bed-spring frame, and a runner slidingly mounted on said bar and adapted to be clamped to the bed-spring frame, as and for the purpose set forth.

In testimony whereof I affix my signature in presence of two witnesses.

JAMES F. PHAGAN.

Witnesses:
ALBERT CHAPMAN,
WILLIAM MURPHY.